(12) United States Patent
Sun (10) Patent No.: US 12,282,442 B2
(45) Date of Patent: Apr. 22, 2025

(54) DATA PROCESSING METHOD AND SYSTEM, AND RELATED COMPONENTS

(71) Applicant: SUZHOU METABRAIN INTELLIGENT TECHNOLOGY CO., LTD., Jiangsu (CN)

(72) Inventor: Minggang Sun, Jiangsu (CN)

(73) Assignee: SHENZHEN METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/718,006

(22) PCT Filed: Sep. 28, 2022

(86) PCT No.: PCT/CN2022/122294
§ 371 (c)(1),
(2) Date: Jun. 7, 2024

(87) PCT Pub. No.: WO2023/206963
PCT Pub. Date: Nov. 2, 2023

(65) Prior Publication Data
US 2025/0045229 A1    Feb. 6, 2025

(30) Foreign Application Priority Data
Apr. 27, 2022   (CN) .......................... 202210447566.3

(51) Int. Cl.
*G06F 13/40*    (2006.01)
*G06F 9/54*    (2006.01)

(52) U.S. Cl.
CPC .......... *G06F 13/4022* (2013.01); *G06F 9/547* (2013.01)

(58) Field of Classification Search
CPC ............................. G06F 13/4022; G06F 9/547
See application file for complete search history.

(56) References Cited

U.S. PATENT DOCUMENTS 6,145,044 A * 11/2000 Ogura ................. G06F 13/4027
710/110
6,243,781 B1 * 6/2001 Gandhi ............... G06F 13/4036
710/313
8,898,206 B1 * 11/2014 Jiang ................... G06F 16/1827
707/827

(Continued)

FOREIGN PATENT DOCUMENTS

CN    107678994 A    2/2018
CN    109542669 A    3/2019

(Continued)

*Primary Examiner* — Faisal M Zaman
(74) *Attorney, Agent, or Firm* — IPro, PLLC (57) ABSTRACT

The present disclosure discloses a data processing method and system, an apparatus, and a computer-readable storage medium, which relate to the field of storage. The data processing method includes determining a root port of a peripheral component interconnect express (PCIe) switch X (PSX) based on a connection topology of a PCIe; controlling a central processing unit (CPU) corresponding to the root port to monitor a read state of memory-mapped remote procedure calls (MRPC) data using a completion timeout mechanism; and in response to the read state being a timeout state, discarding read MRPC data.

19 Claims, 3 Drawing Sheets

(56) References Cited

U.S. PATENT DOCUMENTS

| | | | |
|---|---|---|---|
| 2005/0289306 A1* | 12/2005 | Muthrasanallur ... | G06F 13/1626 |
| | | | 711/158 |
| 2007/0220495 A1* | 9/2007 | Chen .................. | G06F 11/3612 |
| | | | 717/130 |
| 2010/0005205 A1* | 1/2010 | Brune ................ | G06F 13/4031 |
| | | | 370/474 |
| 2013/0060987 A1 | 3/2013 | Bolen et al. | |
| 2016/0098365 A1* | 4/2016 | Bshara ................ | G06F 13/4282 |
| | | | 710/313 |
| 2018/0246833 A1* | 8/2018 | Bai ....................... | G06F 3/0665 |
| 2019/0163469 A1* | 5/2019 | Sreenivasa ............. | H04L 63/08 |
| 2020/0073739 A1* | 3/2020 | Rungta .................... | G06F 8/60 |
| 2022/0075674 A1* | 3/2022 | Miedema ............ | G06F 9/44521 |
| 2022/0334911 A1* | 10/2022 | Zhang ................ | G06F 11/0793 |
| 2023/0259281 A1* | 8/2023 | Yeh ...................... | G06F 3/0655 |
| | | | 711/154 |

FOREIGN PATENT DOCUMENTS

| | | |
|---|---|---|
| CN | 111143106 A | 5/2020 |
| CN | 112395152 A | 2/2021 |
| CN | 114564334 A | 5/2022 |
| JP | 2014197402 A | 10/2014 |

\* cited by examiner

DATA PROCESSING METHOD AND SYSTEM, AND RELATED COMPONENTS

CROSS-REFERENCE TO RELATED APPLICATION

The present disclosure claims the priority of Chinese patent application filed on Apr. 27, 2022 before the CNIPA, China National Intellectual Property Administration with the application number of 202210447566.3, and the title of "MRPC DATA PROCESSING METHOD, SYSTEM AND RELATED COMPONENTS", which is incorporated herein in its entirety by reference.

FIELD

The present disclosure relates to the field of storage, and more particularly to a data processing method and system, and related components.

BACKGROUND

In the field of storage, with the popularity of NVMe (Non-Volatile Memory Express, or Non-Volatile Memory Host Controller Interface Specification, NVMHCIS) SSDs (Solid State Disks), hard disk enclosures directly connected based on PCIe (Peripheral Component Interconnect Express) have also developed, and storage controllers use PCIe cables (usually MiniSasHD cables) to connect JOBHD (Just a Bunch Of Hard Disks) and the hard disk enclosures. In order to meet performance requirements, a bandwidth of the PCIe cables between the storage controllers with the JOBHD is generally more than ×16, while a bandwidth of common MiniSasHD cables is ×4, and thus a plurality of MiniSasHD cables are often used to connect the storage controllers and the JOBHD. After a CPU (Central Processing Unit) sends a data request, if any link between the CPU and a PSX (PCIe Switch X, where X stands for a series) changes, MRPC (Memory-mapped Remote Procedure Calls, which is a chassis management invoking method proposed by Microchip using its switch products) data returned to the CPU may contain illegal data such as 0xff. However, current transmission protocols cannot identify the illegal data, causing the CPU to parse the illegal data as normal data, obtain incorrect parsing results and output incorrect control instructions, and further causing faults such as abnormal temperatures and abnormal fan speeds, thereby seriously affecting operations of a storage system.

SUMMARY

An object of the present disclosure is to provide a data processing method and system, an apparatus, and a computer-readable storage medium, which relate to the field of storage, and may prevent a CPU from making an error response based on parsed error MRPC data, thereby ensuring the normal operation of a storage system.

In order to solve above technical problems, the present disclosure provides a data processing method, including:
  determining a root port of a peripheral component interconnect express (PCIe) switch X (PSX) based on a connection topology of a PCIe;
  controlling a central processing unit (CPU) corresponding to the root port to monitor a read state of memory-mapped remote procedure calls (MRPC) data using a completion timeout mechanism; and
  in response to the read state being a timeout state, discarding read MRPC data.

In some embodiments, controlling the CPU corresponding to the root port to monitor the read state of the MRPC data using the completion timeout mechanism includes:
  configuring one or more registers corresponding to the completion timeout mechanism in the CPU corresponding to the root port to enable the CPU to monitor the read state of the MRPC data using the completion timeout mechanism.

In some embodiments, configuring the registers corresponding to the completion timeout mechanism in the CPU corresponding to the root port includes:
  determining addresses of the registers corresponding to the completion timeout mechanism in the CPU corresponding to the root port using a PCIe specification (spec), and configuring all the registers according to the addresses.

In some embodiments, configuring the registers corresponding to the completion timeout mechanism in the CPU corresponding to the root port to enable the CPU to monitor the read state of the MRPC data using the completion timeout mechanism includes:
  configuring a value of a completion timeout disable bit in a device control register to be 0;
  configuring a value of completion timeout value bits in the device control register to be 0000b;
  configuring a value of a completion timeout mask bit of an uncorrectable error mask register to be 0;
  in response to the returned MRPC data being read, determining that a value of a completion timeout status bit in an uncorrectable error status register is 1 or 0; and
  in response to the value of the completion timeout status bit being 1, determining that the read state is the timeout state, and in response to the value of the completion timeout status bit being 0, determining that the read state is a normal state.

In some embodiments, configuring the registers corresponding to the completion timeout mechanism in the CPU corresponding to the root port further includes:
  in response to the CPU sending a data request to the PSX, configuring the value of the completion timeout status bit in an uncorrectable error status register to be 1.

In some embodiments, after in response to the read state being the timeout state, discarding the read MRPC data, the data processing method further includes:
  controlling the CPU to resend a data request to the PSX.

In some embodiments, controlling the CPU corresponding to the root port to monitor the read state of the MRPC data using the completion timeout mechanism includes:
  determining a CPU connected to the PSX according to the root port; and
  controlling the CPU to monitor the read state of the MRPC data using the completion timeout mechanism.

In some embodiments, controlling the CPU to monitor the read state of the MRPC data using the completion timeout mechanism includes:
  controlling the CPU to send a data request to the PSX; and
  in response to the CPU not receiving a reply message related to the data request within a preset time, triggering the completion timeout mechanism of the PCIe to monitor the read state of the MRPC data.

In some embodiments, the read state being the timeout state includes:

in response to a link between the CPU and the PSX being abnormal, monitoring that the read state of the MRPC data is the timeout state using the completion timeout mechanism.

In some embodiments, wherein configuring the registers corresponding to the completion timeout mechanism in the CPU corresponding to the root port further includes:
configuring an advanced error reporting capability register of the root port.

In some embodiments, determining that the value of the completion timeout status bit in the uncorrectable error status register is 1 or 0 includes:
reading data returned by a relevant small computer system interface (SCSI) enclosure services (SES) instruction using an MRPC instruction;
configuring the advanced error reporting capability register of the root port according to a PCIe specification (spec), and reading the uncorrectable error status register; and
determining that the value of the completion timeout status bit in the uncorrectable error status register is 1 or 0.

In some embodiments, discarding the read MRPC data includes:
controlling the CPU to discard the read MRPC data.

In some embodiments, after controlling the CPU corresponding to the root port to monitor the read state of the MRPC data using the completion timeout mechanism, the data processing method further includes:
in response to the read state being a non-timeout state, controlling the CPU to parse the read MRPC data.

In some embodiments, after controlling the CPU to discard the read MRPC data, the data processing method further includes:
re-reading the MRPC data; and
in response to a value of a completion timeout status bit being 0, determining that no timeout has occurred, and reading complete MRPC data.

In some embodiments, before configuring the registers corresponding to the completion timeout mechanism in the CPU corresponding to the root port, the data processing method further includes:
obtaining the PCIe spec.

In order to solve the above technical problems, the present disclosure further provides a data processing system, including:
a determining module configured to determine a root port of a peripheral component interconnect express (PCIe) switch X (PSX) based on a connection topology of a PCIe;
a monitoring module configured to control a central processing unit (CPU) corresponding to the root port to monitor a read state of memory-mapped remote procedure calls (MRPC) data using a completion timeout mechanism; and
a processing module configured to in response to the read state being a timeout state, discard read MRPC data.

In some embodiments, controlling the CPU corresponding to the root port to monitor the read state of the MRPC data using the completion timeout mechanism includes:
configuring one or more registers corresponding to the completion timeout mechanism in the CPU corresponding to the root port to enable the CPU to monitor the read state of the MRPC data using the completion timeout mechanism.

In order to solve the above technical problems, the present disclosure further provides a data processing apparatus, including:
a memory for storing computer programs; and
a processor for executing the computer programs to implement any one of the steps of the data processing method described above.

In order to solve the above technical problems, the present disclosure further provides a non-transitory readable storage medium storing computer programs, wherein the computer programs, when executed by a processor, cause the processor to perform any one of the steps of the data processing method described above.

In order to solve the above technical problems, the present disclosure further provides a computer program product including computer-readable codes, wherein the computer-readable codes, when run on a computing and processing device, cause the computing and processing device to perform any one of the steps of the data processing method described above.

According to the data processing method provided by the present disclosure, by first determining the root port of the PSX, and then determining the CPU connected to the PSX; if the link between the PSX and the CPU is abnormal, monitoring that the read state of the MRPC data is the timeout state using the completion timeout mechanism of the CPU, then determining that the MRPC data returned to the CPU by the PSX may contain illegal data, and discarding the MRPC data, the CPU may be prevented from making an error response based on parsed error MRPC data, thereby ensuring the normal operation of a storage system. The present disclosure also provides a data processing system, an apparatus and a computer-readable storage medium, which have the same beneficial effects as the above data processing method.

BRIEF DESCRIPTION OF THE DRAWINGS

In order to more clearly illustrate the embodiments of the present disclosure, the figures required to be used in the embodiments will be briefly described below. Apparently, the figures that are described below are merely embodiments of the present disclosure, and a person skilled in the art can obtain other figures according to the provided figures without paying creative work.

DETAILED DESCRIPTION

A core of the present disclosure is to provide a data processing method and system, an apparatus, and a computer-readable storage medium, which relate to the field of storage, and may prevent a CPU from making an error response based on parsed error MRPC data, thereby ensuring the normal operation of a storage system.

In order that objects, aspects, and advantages of the embodiments of the present disclosure become more apparent, the technical solutions in the embodiments of the present disclosure will be described clearly and completely below in conjunction with accompanying drawings in the embodiments of the present disclosure. Apparently, the described embodiments are only a part of the embodiments of the present disclosure, not all the embodiments. Based on the embodiments of the present disclosure, all other embodiments obtained by a person skilled in the art without involving creative work should also fall within the protection scope of the present disclosure.

Figure 1:
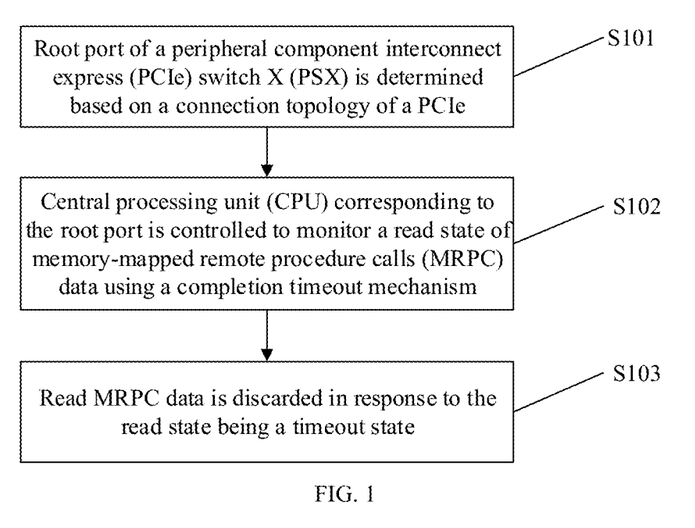
FIG. 1 is a flowchart of steps of a data processing method according to the present disclosure.

Referring to FIG. 1, FIG. 1 is a flowchart of steps of a data processing method according to the present disclosure. The data processing method includes the following steps.

S101, a root port of a peripheral component interconnect express (PCIe) switch X (PSX) is determined based on a connection topology of a PCIe.

A storage system includes a plurality of PSXs and a plurality of CPUs, and at first, it is necessary to determine a CPU that interacts with a PSX. Considering that PCIe devices are connected to a root port in a tree-like manner, a root port of the PSX can be determined according to a connection topology of a PCIe, and thus the CPU that interacts with the PSX for data can be determined.

The CPU can manage switches such as the PSXs through a GAS (Global Address Space) and MRPC command sets.

S102, a central processing unit (CPU) corresponding to the root port is controlled to monitor a read state of memory-mapped remote procedure calls (MRPC) data using a completion timeout mechanism; and S103, read MRPC data is discarded in response to the read state being a timeout state.

After the CPU sends a data request to the PSX, if a corresponding reply is not received within a preset time, a completion timeout mechanism of the PCIe will be will triggered, and data will be returned to the CPU. Meanwhile, the completion timeout mechanism can monitor whether the MRPC data has been read timeout. If it is monitored that the MRPC data has been read timeout, it means that a link between the CPU and the PSX may change. At this time, MRPC data read by the CPU is data returned after the completion timeout mechanism is triggered, and the MRPC data may include illegal data, therefore, it is necessary for the CPU to discard the MRPC data to avoid making an error response, thereby ensuring the safe operation of the storage system.

It can be seen that according to the data processing method provided by the embodiments of the present disclosure, by first determining the root port of the PSX, and then determining the CPU connected to the PSX; if the link between the PSX and the CPU is abnormal, monitoring that the read state of the MRPC data is the timeout state using the completion timeout mechanism of the CPU, then determining that the MRPC data returned to the CPU by the PSX may contain illegal data, and discarding the MRPC data, the CPU may be prevented from making an error response based on parsed error MRPC data, thereby ensuring the normal operation of a storage system.

On the basis of the above embodiment:
in some embodiments, a process of controlling the CPU corresponding to the root port to monitor the read state of the MRPC data using the completion timeout mechanism includes:
configuring one or more registers corresponding to the completion timeout mechanism in the CPU corresponding to the root port to enable the CPU to monitor the read state of the MRPC data using the completion timeout mechanism.

In some embodiments, a process of configuring the registers corresponding to the completion timeout mechanism in the CPU corresponding to the root port includes:
determining addresses of the registers corresponding to the completion timeout mechanism in the CPU corresponding to the root port using a PCIe specification (spec), and configuring all the registers according to the addresses.

In some embodiments, after in response to the read state being the timeout state, discarding the read MRPC data, the data processing method further includes:
controlling the CPU to resend a data request to the PSX.

In the embodiment, by configuring the registers corresponding to the completion timeout mechanism in the CPU, the read state of the MRPC data can be monitored using the completion timeout mechanism. Before configuring the registers, it is necessary to obtain a PCIe spec (PCIe specification) and determine an address of each relevant register of the registers according to the PCIe spec, so that the register corresponding to the address can be configured.

Firstly, a Device Control 2 register (that is, a device control register) of the root port is configured according to the PCIe spec, and a bit of a completion timeout disable is set as 0, that is, a value of a completion timeout disable bit in the device control register is 0, so as to enable the completion timeout mechanism. Next, a value of completion timeout value bits in the Device Control 2 register of the root port is configured to 0000b according to the PCIe spec, so as to set a completion timeout time to be 50 ms. Then, an advanced error reporting capability register of the root port is configured according to the PCIe spec, and a bit of a completion timeout mask in an uncorrectable error mask register is set as 0, so as to enable the completion timeout error reporting. PSX MRPC addresses are mapped using a conventional PCIe device reading and writing manner, and a relevant SES (Small Computer System Interface (SCSI) Enclosure Services) instruction is written to the PSX using an MRPC instruction. The advanced error reporting capability register of the root port is configured according to the PCIe spec, and a bit of a completion timeout status in the uncorrectable error status register is set as 1, that is, when the CPU sends a data request to the PSX, a value of a completion timeout status bit in the uncorrectable error status register is configured to be 1, so as to clear a completion timeout error status. Data returned by the relevant SES instruction is read by using the MRPC instruction, the advanced error reporting capability register of the root port is configured according to the PCIe spec, the uncorrectable error status register is read, and it is determined whether the bit of the completion timeout status is 1. If the bit of the completion timeout status is 1, a read timeout has occurred, and the returned MRPC data may include illegal data such as 0xff, therefore, the returned MRPC data should be discarded, and the MRPC data needs to be re-read. When the bit of the completion timeout status is 0, no timeout occurs, and the data is safe and complete, and thus the CPU can normally parse the data normally after reading.

Figure 2:
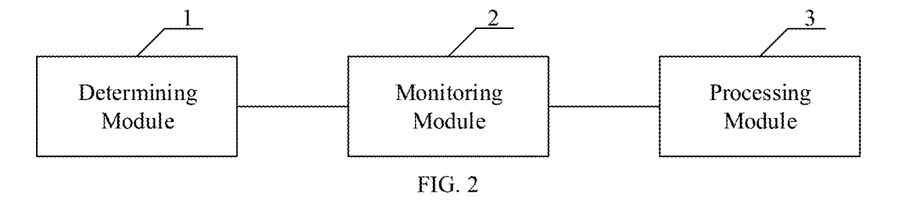
FIG. 2 is a schematic structural diagram of a data processing system according to the present disclosure.

Referring to FIG. 2, FIG. 2 is a schematic structural diagram of a data processing system according to the present disclosure. The data processing system includes:
a determining module 1 configured to determine a root port of a peripheral component interconnect express (PCIe) switch X (PSX) based on a connection topology of a PCIe;
a monitoring module 2 configured to control a central processing unit (CPU) corresponding to the root port to monitor a read state of memory-mapped remote procedure calls (MRPC) data using a completion timeout mechanism; and a processing module 3 configured to in response to the read state being a timeout state, discard read MRPC data.

It can be seen that according to the data processing system provided by the embodiments of the present disclosure, by first determining the root port of the PSX, and then determining the CPU connected to the PSX; if the link between the PSX and the CPU is abnormal, monitoring that the read state of the MRPC data is the timeout state using the completion timeout mechanism of the CPU, then determining that the MRPC data returned to the CPU by the PSX may contain illegal data, and discarding the MRPC data, the CPU may be prevented from making an error response based on parsed error MRPC data, thereby ensuring the normal operation of a storage system.

In some embodiments, controlling the CPU corresponding to the root port to monitor the read state of the MRPC data using the completion timeout mechanism includes:

configuring one or more registers corresponding to the completion timeout mechanism in the CPU corresponding to the root port to enable the CPU to monitor the read state of the MRPC data using the completion timeout mechanism.

In some embodiments, configuring the registers corresponding to the completion timeout mechanism in the CPU corresponding to the root port includes:

determining addresses of the registers corresponding to the completion timeout mechanism in the CPU corresponding to the root port using a PCIe specification (spec), and configuring all the registers according to the addresses.

In some embodiments, configuring the registers corresponding to the completion timeout mechanism in the CPU corresponding to the root port to enable the CPU to monitor the read state of the MRPC data using the completion timeout mechanism includes:

configuring a value of a completion timeout disable bit in a device control register to be 0;

configuring a value of completion timeout value bits in the device control register to be 0000b;

configuring a value of a completion timeout mask bit of an uncorrectable error mask register to be 0;

in response to the returned MRPC data being read, determining that a value of a completion timeout status bit in an uncorrectable error status register is 1 or 0; and in response to the value of the completion timeout status bit being 1, determining that the read state is the timeout state, and in response to the value of the completion timeout status bit being 0, determining that the read state is a normal state.

In some embodiments, configuring the registers corresponding to the completion timeout mechanism in the CPU corresponding to the root port further includes:

in response to the CPU sending a data request to the PSX, configuring the value of the completion timeout status bit in the uncorrectable error status register to be 1.

In some embodiments, the data processing system further includes:

a controller module configured to control the CPU to resend a data request to the PSX.

In another aspect, the present disclosure also provides a data processing apparatus, including:

a memory for storing a computer program; and a processor for executing the computer programs to implement the steps of the data processing method described in any one of the above embodiments.

The description of the data processing apparatus provided by the present disclosure refers to the above embodiments, which will not be repeated here.

The data processing apparatus provided by the present disclosure has the same beneficial effects as the above data processing method.

In another aspect, the present disclosure also provides a non-transitory readable storage medium storing computer programs, wherein the computer programs, when executed by a processor, cause the processor to perform the steps of the data processing method described in any one of the above embodiments.

The description of the non-transitory readable storage medium provided by the present disclosure refers to the above embodiments, which will not be repeated here.

The non-transitory readable storage medium provided by the present disclosure has the same beneficial effects as the above data processing method.

In another aspect, the present disclosure also provides a computer program product including computer-readable codes, wherein the computer-readable codes, when run on a computing and processing device, cause the computing and processing device to perform the steps of the data processing method described in any one of the above embodiments.

Various component embodiments of the present disclosure can be implemented by hardware, or implemented by software modules operating on one or more processors, or implemented by the combination thereof. A person skilled in the art should understand that, in practice, a microprocessor or a digital signal processor (DSP) can be used to realize some or all of the functions of some or all of the modules in the device according to the embodiments of the present disclosure. The present disclosure can further be implemented as device program (for example, computer program and computer program product) for executing some or all of the methods as described herein. Such program for implementing the present disclosure can be stored in the computer-readable medium, or have a form of one or more signals. Such a signal can be downloaded from the internet websites, or be provided in carrier, or be provided in other manners.

Figure 3:
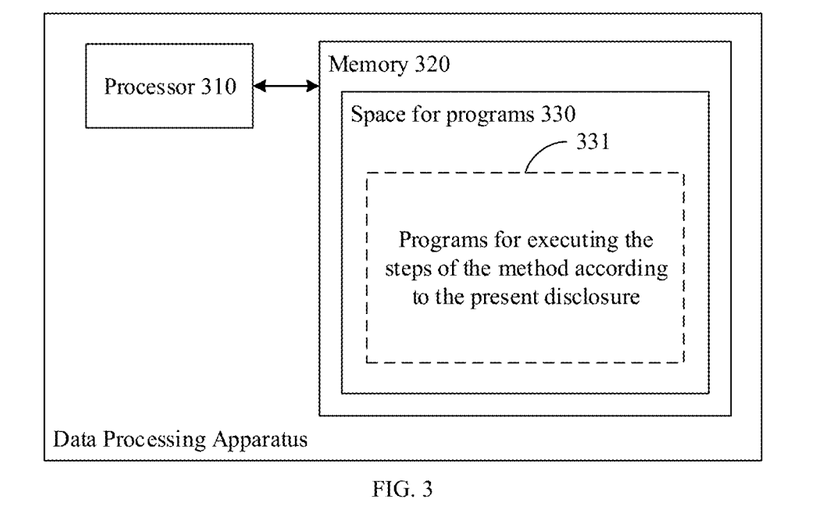
FIG. 3 schematically illustrates a block diagram of a data processing apparatus for executing the method according to the present disclosure.
Figure 4:
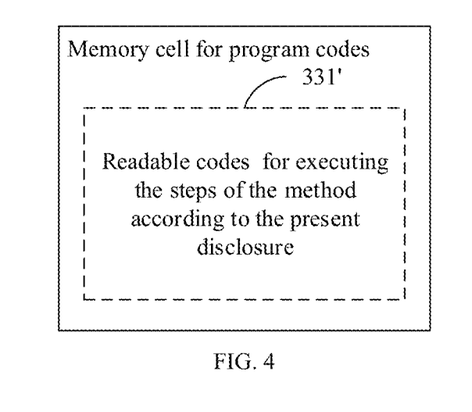
FIG. 4 schematically illustrates a memory cell for maintaining or carrying program codes for implementing the method according to the present disclosure.

For example, FIG. 3 illustrates a data processing apparatus for implementing the method according to the present disclosure. The data processing apparatus includes a processor 310 and a computer program product or a computer-readable medium in form of a memory 320. The memory 320 can be electronic memories such as flash memory, EEPROM (Electrically Erasable Programmable Read-Only Memory), EPROM, hard disk or ROM. The memory 320 has a memory space 330 for executing program codes 331 of any step in the above methods. For example, the memory space 330 for program codes can include respective program codes 331 for implementing the respective steps in the method mentioned above. These program codes can be read from and/or be written into one or more computer program products. These computer program products include program code carriers such as hard disks, compact disks (CDs), memory cards or floppy disks. These computer program products are usually the portable or stable memory cells as shown in reference FIG. 4. The memory cells can be provided with memory sections, memory spaces, etc., similar to the memory 320 of the server as shown in FIG. 3. The program codes can be compressed for example in an appropriate form. In general, the memory cell includes computer-readable codes 331' which can be read for example by processors 310. When these codes are operated on the server, the server can execute respective steps in the method described above.

It should also be noted that in the present description, relationship terms such as first and second are merely intended to distinguish one entity or operation from another entity or operation, and do not necessarily require or imply any such actual relationship or order between those entities or operations. Further, the terms "includes", "comprises" or any other variation thereof are intended to cover non-exclusive inclusion, such that a process, method, article, or device including a series of elements includes not only those elements, but also other elements not expressly listed, or elements that are inherent to such a process, method, article, or device. Without further limitation, the elements defined by the statement "including a . . . " do not preclude the existence of additional identical elements in the process, method, article, or device that include the elements.

The above description on the disclosed embodiments enables a person skilled in the art to implement or use the present disclosure. Various modifications on these embodiments will be apparent to a person skilled in the art, and the general principle defined herein may be implemented in other embodiments without departing from the spirit or scope of the present disclosure. Therefore, the present disclosure should not be limited to the embodiments illustrated herein, but should be accorded the broadest scope in accord with the principle and the novel characteristics disclosed herein.

The invention claimed is:

1. A data processing method, comprising:
   determining a root port of a peripheral component interconnect express (PCIe) switch X (PSX) based on a connection topology of a PCIe;
   controlling a central processing unit (CPU) corresponding to the root port to monitor a read state of memory-mapped remote procedure calls (MRPC) data using a completion timeout mechanism; and
   in response to the read state being a timeout state, discarding read MRPC data.

2. The data processing method according to claim 1, wherein controlling the CPU corresponding to the root port to monitor the read state of the MRPC data using the completion timeout mechanism comprises:
   configuring one or more registers corresponding to the completion timeout mechanism in the CPU corresponding to the root port to enable the CPU to monitor the read state of the MRPC data using the completion timeout mechanism.

3. The data processing method according to claim 2, wherein configuring the registers corresponding to the completion timeout mechanism in the CPU corresponding to the root port comprises:
   determining addresses of the registers corresponding to the completion timeout mechanism in the CPU corresponding to the root port using a PCIe specification (spec), and configuring all the registers according to the addresses.

4. The data processing method according to claim 2, wherein configuring the registers corresponding to the completion timeout mechanism in the CPU corresponding to the root port to enable the CPU to monitor the read state of the MRPC data using the completion timeout mechanism comprises:
   configuring a value of a completion timeout disable bit in a device control register to be 0;
   configuring a value of completion timeout value bits in the device control register to be 0000b;
   configuring a value of a completion timeout mask bit of an uncorrectable error mask register to be 0;
   in response to the returned MRPC data being read, determining that a value of a completion timeout status bit in an uncorrectable error status register is 1 or 0; and
   in response to the value of the completion timeout status bit being 1, determining that the read state is the timeout state, and in response to the value of the completion timeout status bit being 0, determining that the read state is a normal state.

5. The data processing method according to claim 4, wherein configuring the registers corresponding to the completion timeout mechanism in the CPU corresponding to the root port further comprises:
   in response to the CPU sending a data request to the PSX, configuring the value of the completion timeout status bit in the uncorrectable error status register to be 1.

6. The data processing method according to claim 1, wherein after in response to the read state being the timeout state, discarding the read MRPC data, the data processing method further comprises:
   controlling the CPU to resend a data request to the PSX.

7. The data processing method according to claim 1, wherein controlling the CPU corresponding to the root port to monitor the read state of the MRPC data using the completion timeout mechanism comprises:
   determining a CPU connected to the PSX according to the root port; and
   controlling the CPU to monitor the read state of the MRPC data using the completion timeout mechanism.

8. The data processing method according to claim 7, wherein controlling the CPU to monitor the read state of the MRPC data using the completion timeout mechanism comprises:
   controlling the CPU to send a data request to the PSX; and
   in response to the CPU not receiving a reply message related to the data request within a preset time, triggering the completion timeout mechanism of the PCIe to monitor the read state of the MRPC data.

9. The data processing method according to claim 1, wherein the read state being the timeout state comprises:
   in response to a link between the CPU and the PSX being abnormal, monitoring that the read state of the MRPC data is the timeout state using the completion timeout mechanism.

10. The data processing method according to claim 4, wherein configuring the registers corresponding to the completion timeout mechanism in the CPU corresponding to the root port further comprises:
    configuring an advanced error reporting capability register of the root port.

11. The data processing method according to claim 10, wherein determining that the value of the completion timeout status bit in the uncorrectable error status register is 1 or 0 comprises:
    reading data returned by a relevant small computer system interface (SCSI) enclosure services (SES) instruction using an MRPC instruction;
    configuring the advanced error reporting capability register of the root port according to a PCIe specification (spec), and reading the uncorrectable error status register; and
    determining that the value of the completion timeout status bit in the uncorrectable error status register is 1 or 0.

12. The data processing method according to claim 1, wherein discarding the read MRPC data comprises:
controlling the CPU to discard the read MRPC data.

13. The data processing method according to claim 1, wherein after controlling the CPU corresponding to the root port to monitor the read state of the MRPC data using the completion timeout mechanism, the data processing method further comprises:
in response to the read state being a non-timeout state, controlling the CPU to parse the read MRPC data.

14. The data processing method according to claim 12, wherein after controlling the CPU to discard the read MRPC data, the data processing method further comprises:
re-reading the MRPC data; and
in response to a value of a completion timeout status bit being 0, determining that no timeout has occurred, and reading complete MRPC data.

15. The data processing method according to claim 3, wherein before configuring the registers corresponding to the completion timeout mechanism in the CPU corresponding to the root port, the data processing method further comprises:
obtaining the PCIe spec.

16. A data processing apparatus, comprising:
a memory for storing computer programs; and
a processor for executing the computer programs to implement the steps of the data processing method according to claim 1.

17. A non-transitory readable storage medium storing computer programs, wherein the computer programs, when executed by a processor, cause the processor to perform the steps of the data processing method according to claim 1.

18. The data processing method according to claim 1, wherein the PCIe is connected to the root port in a tree-like manner.

19. The data processing method according to claim 1, wherein the CPU manages the PSX through a global address space (GAS) and MRPC command sets.

* * * * *

UNITED STATES PATENT AND TRADEMARK OFFICE
CERTIFICATE OF CORRECTION

PATENT NO. : 12,282,442 B2
APPLICATION NO. : 18/718006
DATED : April 22, 2025
INVENTOR(S) : Minggang Sun Page 1 of 1

It is certified that error appears in the above-identified patent and that said Letters Patent is hereby corrected as shown below:

On the Title Page

Item (71) should read:
Applicant: SUZHOU METABRAIN INTELLIGENT TECHNOLOGY CO., LTD., Suzhou, Jiangsu (CN)

Item (72) should read:
Inventor: Minggang Sun, Suzhou, Jiangsu (CN)

Item (73) should read:
Assignee: SUZHOU METABRAIN INTELLIGENT TECHNOLOGY CO., LTD., Suzhou, Jiangsu (CN)

Signed and Sealed this
Second Day of September, 2025

Coke Morgan Stewart
*Acting Director of the United States Patent and Trademark Office*